United States Patent [19]

Yokoyama et al.

[11] Patent Number: 4,668,842

[45] Date of Patent: May 26, 1987

[54] HEADPHONE

[75] Inventors: Yoshihiro Yckoyama; Yoshiyuki Kamon; Tsutomu Kakiuchi, all of Kanagawa, Japan

[73] Assignee: Sony Corporation, Tokyo, Japan

[21] Appl. No.: 615,543

[22] Filed: May 31, 1984

[30] Foreign Application Priority Data

May 31, 1983 [JP] Japan .................................. 58-96061

[51] Int. Cl.[4] .......................... H04M 1/05; H04R 1/10

[52] U.S. Cl. ...................................... 381/183; 381/187

[58] Field of Search ........... 179/156 R, 156 A, 182 R, 179/182 A; 181/129

[56] References Cited

U.S. PATENT DOCUMENTS

| | | | |
|---|---|---|---|
| 1,668,910 | 5/1978 | Jones | 179/182 R |
| 3,787,899 | 1/1974 | Krawagna | 179/156 R |
| 4,160,135 | 7/1979 | Görike | 179/182 R |
| 4,403,120 | 9/1983 | Yoshimi | 179/182 A |
| 4,429,194 | 1/1984 | Kamon et al. | 179/182 A |

FOREIGN PATENT DOCUMENTS

| | | | |
|---|---|---|---|
| 57-17295 | 1/1982 | Japan | 179/156 R |
| 57-17296 | 1/1982 | Japan | 179/156 R |
| 57-76993 | 5/1982 | Japan | 179/156 R |
| 57-76994 | 5/1982 | Japan | 179/156 R |
| 1508101 | 4/1978 | United Kingdom | 179/156 R |
| 2078057 | 12/1981 | United Kingdom | 179/156 R |
| 2082020 | 2/1982 | United Kingdom | 179/156 R |

*Primary Examiner*—Gene Z. Rubinson
*Assistant Examiner*—Danita R. Byrd
*Attorney, Agent, or Firm*—Hill, Van Santen, Steadman & Simpson

[57] ABSTRACT

A headphone having a speaker unit having a diaphragm and a supporting member for supporting the speaker unit so as to face forwardly of a user's head with projection of an edge portion thereof into the cavum concha whereby the speaker diaphgram faces to the entrance of a user's auditory canal with the sound radiating direction thereof.

7 Claims, 11 Drawing Figures

HEADPHONE

BACKGROUND OF THE INVENTION

1. Field of the Invention

The present invention relates generally to an electro-acoustic transducer and more particularly is directed to a headphone for reproducing an audio signal.

2. Description of the Prior Art

A headphone has hitherto been proposed to have a housing incorporating therein a speaker unit which is inserted into an auricle as shown in FIG. 1. In FIG. 1, reference numeral 1 designates a housing of substantially circular truncated cone shape into which a speaker unit 2 is incorporated. Reference numeral 3 designates a protector member disposed at the position opposite to a diaphragm *2a* of the speaker unit 2. A large number of apertures are bored through the protector member 3 to pass therethrough the sound emanated from the speaker unit 2. Reference numeral 4 designates a cord supporting member and 5 a cord.

Such prior art headphone is inserted into an auricle A and secured therein in shown in FIG. 2. Generally, as the common shape of the auricle A of a human ear, there is a recess of substantially circular truncated cone, namely, a so-called cavum concha C at the forward side surface of which the entrance of an external auditory meatus B lies. At the lower side of the cavum concha C, a so-called tragus D and an anti-tragus E protrude toward the upper side of the cavum concha C from both sides thereof to from a gap of substantially U-shape, namely, so-called inter-tragus notch F between the tragus D and the anti-tragus E. The housing 1 of the headphone is positioned within the cavum concha C and held between the tragus D and the anti-tragus E and the cord supporting member 4 is disposed in the notch F.

By the way, the prior art headphone shown in FIG. 1 is inserted into the auricle A and secured therein by utilizing the shape of the auricle A common to the human ear. However, the auricle A of the human ear is different in size dependent upon a user and therefore the headphone may be either too large or too small for the user. Thus, there is a disadvantage that the user of the headphone frequently feels pain too strong permit use of the headphone.

Further, since the external auditory meatus B obliquely extends forwardly relative to the cavum concha C, the headphone positioned within the cavum concha C and facing the head inevitably causes the diaphragm *2a* of the speaker unit 2 thereof to be inappropriately angled relative to the external auditory meatus B. The shapes of the external auditory meatus B and the periphery of its entrance are different, dependent upon users. As a result, when the headphone is inserted into the auricle A with the diaphragm *2a* oriented slantwise relative to the external auditory meatus B, the sound radiated from the diaphragm *2a* is reflected by the external auditory meatus B and around the entrance of the external auditory meatus B and then reached to the eardrum or tympanum. Thus, the sounds reflected by the external auditory meatus B and around the entrance of the external auditory meatus B of each different shape provide tone quality that is different depending on the individual.

OBJECTS AND SUMMARY OF THE INVENTION

Accordingly, it is an object of the present invention to provide an improved headphone.

It is another object of the present invention to provide a headphone which can satisfactorily be used regardless of the size of the auricle of a human ear.

It is a further object of the present invention to provide a headphone capable of producing a sound with an excellent quality without being relatively affected by the shape of the auricle of a human ear.

According to one aspect of the present invention, there is provided a headphone comprising:

(a) a speaker unit having a diaphragm; and (b) a supporting member for supporting said speaker unit so as to face forward toward the entrance of a user's auditory canal with the sound radiating direction of the unit.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
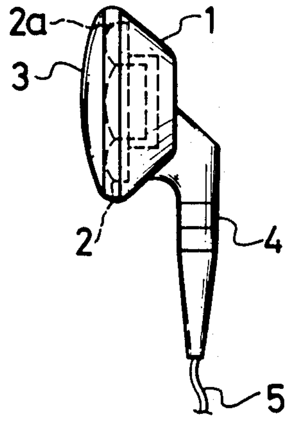
FIG. 1 (PRIOR ART)
FIG. 1 is a side view showing an example of a prior art headphone having a housing with a speaker unit incorporated therein which is inserted into an auricle.
Figure 2:
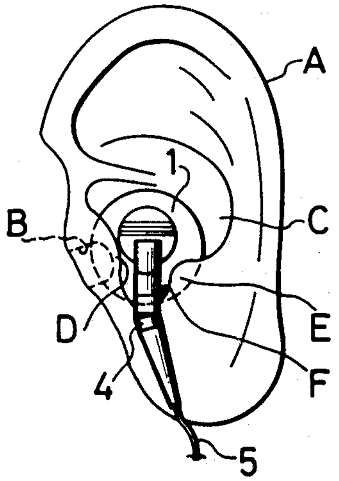
FIG. 2 (PRIOR ART)
FIG. 2 is a schematic view useful for the explanation of the prior art headphone in FIG. 1 upon use.

Now, an embodiment of the headphone according to the present invention will hereinafter be described with reference to FIGS. 3 to 7. Throughout FIGS. 3 to 7, like parts corresponding to those in FIGS. 1 and 2 are marked with the same references and will not be described in detail.

Figure 3:
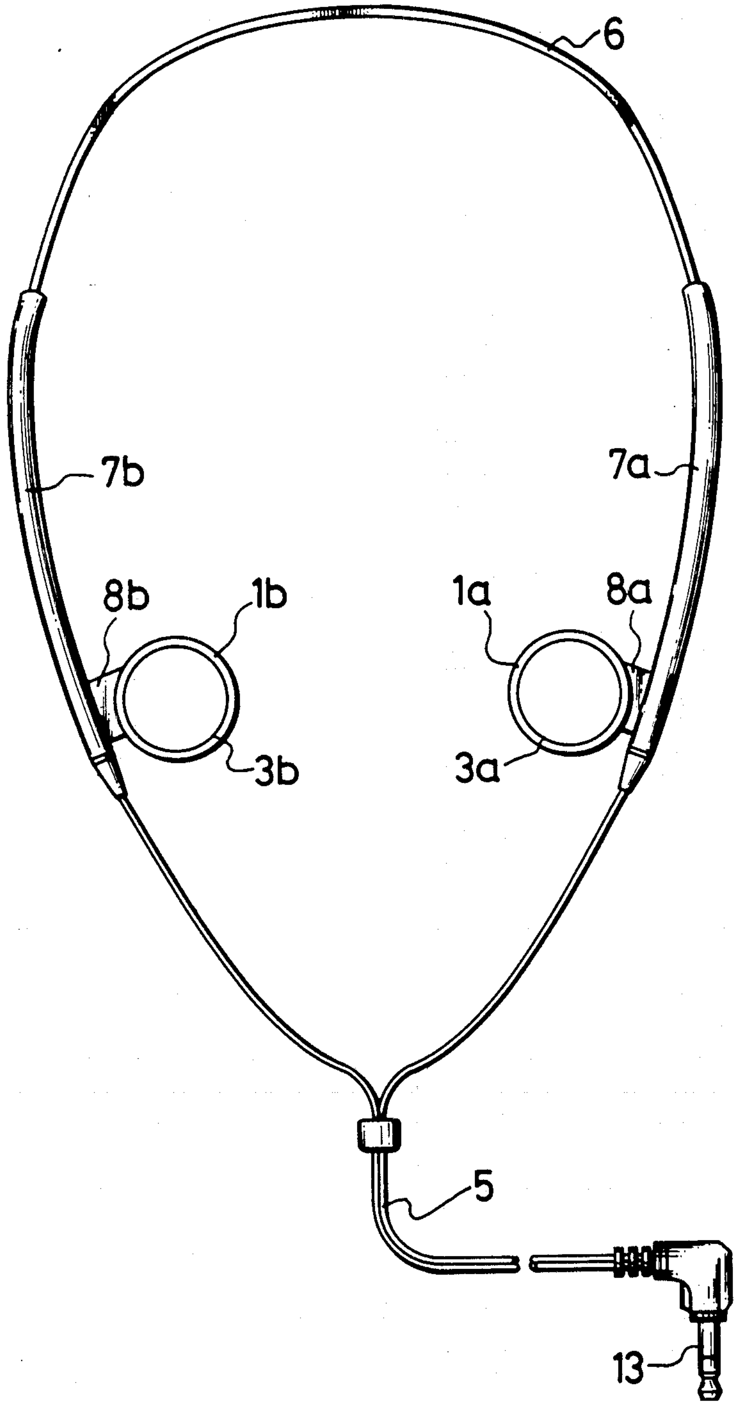
FIG. 3 is a front view showing an embodiment of a headphone according to the present invention.
Figure 4:
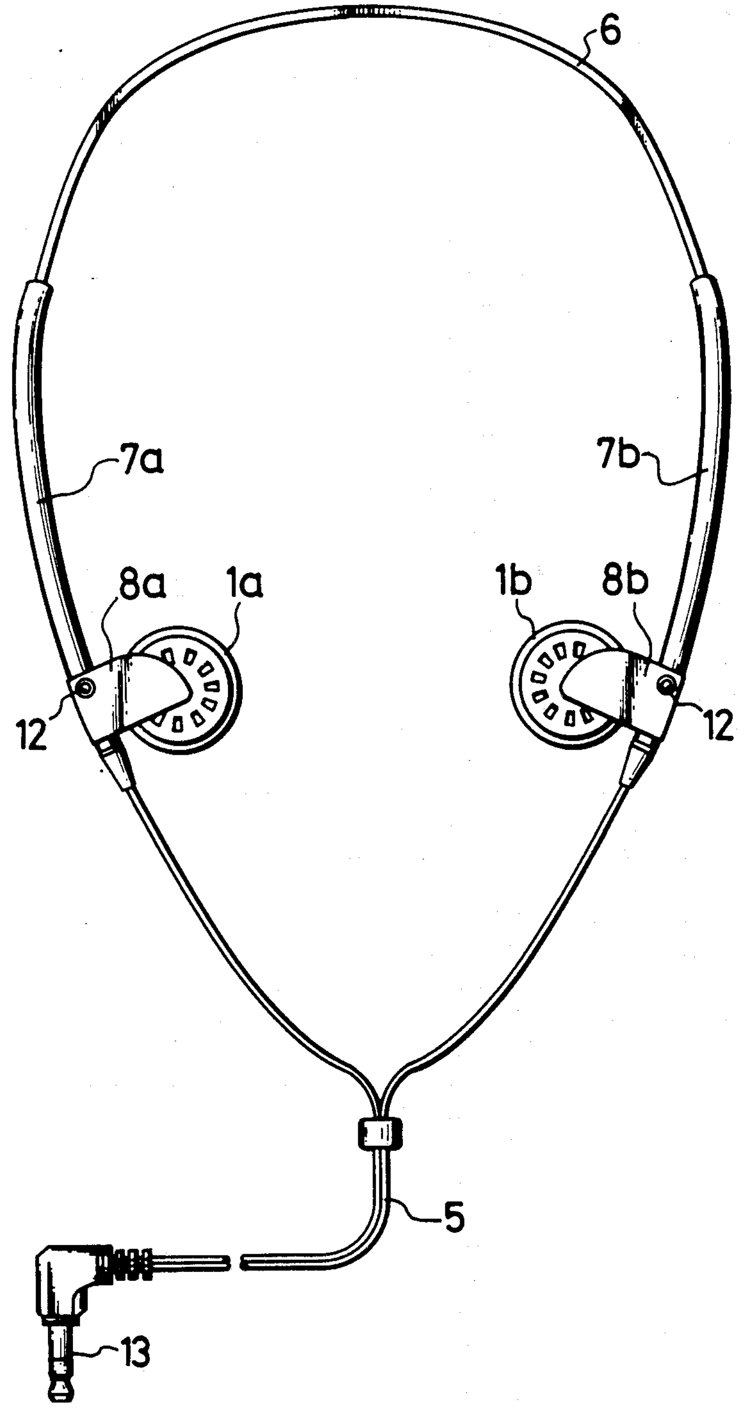
FIG. 4 is a rear view showing the rear side of the headphone shown in FIG. 3.
Figure 5:
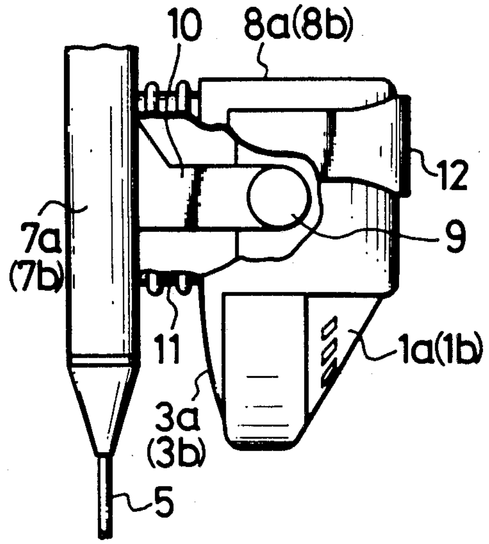
FIG. 5 is a partially broken away side view of the main part of the headphone according to the present invention shown in FIG. 3.
Figure 6:
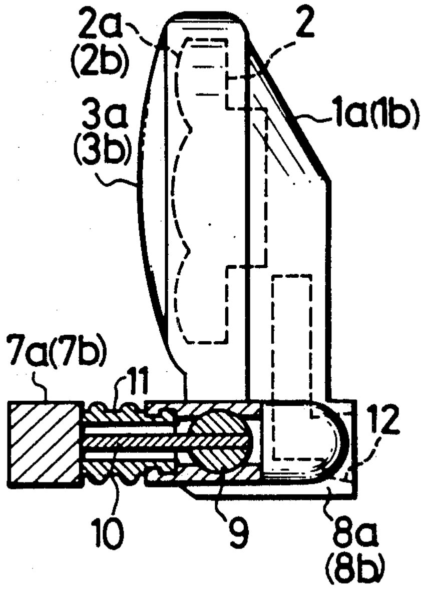
FIG. 6 is a plan view of the headphone shown in FIG. 5, in partial cross-section.

In this embodiment of the invention, as shown in FIGS. 3 and 4, a pair of housings 1*a* and 1*b* (each of which is substantially same as 1 in FIG. 1) are respectively attached through housing holders 8*a* and 8*b* to end portions of hangers 7*a* and 7*b* which are respectively positioned at both side ends of a horseshoe-shape headband 6 and hold therein the horseshoe-shape headband 6. In this case, the paired housings 1*a* and 1*b* are respectively attached to the hangers 7*a* and 7*b* in such a fashion that when the headband 6 is stretched over a user's head, the diaphragm 2*a* of the speaker unit 2 is oriented in the same forward facing plane direction as that of the user's face, or, in other words, that the diaphragm 2*a* of the speaker unit 2 is made in parallel to the plane including the headband 6 and the hangers 7*a* and 7*b*. The housing holders 8*a* and 8*b* respectively couple through so-called universal joints the housings 1*a* and 1*b* to the hangers 7*a* and 7*b* to be rotatable as shown in FIGS. 5 and 6.

The housing holders 8*a* and 8*b* will be described more in detail with reference to FIGS. 5 and 6. In FIGS. 5 and 6, reference numeral 9 designates a stopper ball of a spherical-shape fixed through a plate-shape connector 10 to the hangers 7*a* and 7*b*. The stopper ball 9 is engaged with spherical concave portions formed within the housing holder 8*a* so that the housings 8*a* and 8*b* become rotatable relative to the stopper ball 9. Reference numeral 11 designates a joint cover disposed between the hangers 7*a*, 7*b* and the housing holders 8*a*, 8*b* to cover the connector 10. The joint cover 11 is resiliently deformed to allow the rotation of the housing holders 8*a*, 8*b*. Reference numeral 12 designates a so-called acoustic pipe or sound duct which serves to communicate the rear side of the speaker unit 2 with the outside via a predetermined length. If the length of the sound duct 12 is selected to be a predetermined one, the bass resonance frequency can be lower than that of the speaker unit 2 itself.

In FIGS. 3 and 4, reference numeral 13 designates a plug. Other arrangements of the speaker unit 2 and the like are constructed same as those of the prior art headphone.

Figure 7:
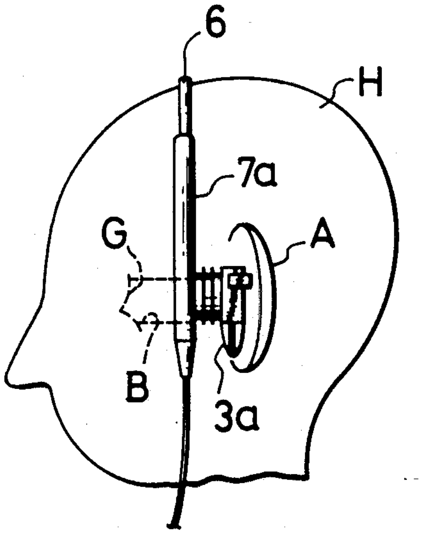
FIG. 7 is a diagram useful for the explanation of the headphone shown in FIG. 3 upon use.

As shown in FIG. 7, since the headband 6 is stretched over a user's head H and the housings 1*a* and 1*b* are respectively inserted into the user's left and right auricles A in such a fashion that the diaphragms 2*a* of the speaker units 2 are respectively opposed to, or facing, the entrances of the external auditory meatus B, substantially half of each of the housings 1*a* and 1*b* is inserted into the cavum concha C so that the diaphragm 2*a* of the speaker unit 2 is opposite to the tragus D. Thus, regardless of the size of the cavum concha C, tragus D, anti-tragus E and the like of the auricle A, most of the users can use this headphone satisfactorily. In this case, the diaphragm 2*a* of the speaker unit 2 faces the external auditory meatus B and toward the tympanum G so that most of the sound emanated from the diaphragm 2*a* of the speaker unit 2 is directly transmitted to the tympanum G and a relatively little sound is reflected on the external auditory meatus B and around the entrance thereof. As a result, the sound emanated from the diaphragm 2*a* of the speaker unit 2 is not much influenced by the shape of the external auditory meatus B and the shape of the entrance of the external auditory meatus. B, which are both peculiar to individual users, thus providing excellent tone quality.

As set forth above, according to the headphone of the present invention, there is provided the supporting member formed of the headband 6, the hangers 7*a*, 7*b* and the like for the speaker unit 2. And, owing to the supporting member consisting of the headband 6, the hangers 7*a*, 7*b* and the like, the diaphragm 2*a* of the speaker unit 2 can be opposed to the entrance of the external auditory meatus B. Thus, substantially half of each of the housings 1*a* and 1*b* is inserted into the cavum concha C so that the diaphragm 2*a* of the speaker unit 2 is opposed to the tragus D. Therefore, regardless of different sizes of the cavum concha C, tragus D, anti-tragus E and the like in the auricle A, the headphone of the invention can be satisfactorily fitted to almost all the users. Moreover, since the diaphragm 2*a* of the speaker unit 2 is opposed through the external auditory meatus B to the tympanum G, most of the sound emanated from the diaphragm 2*a* of the speaker unit 2 is directly transmitted to the tympanum G and a relatively little sound is reflected on the external auditory meatus B and on the entrance of the external auditory meatus B. Accordingly, without influence by different shapes of the external auditory meatus B and of the entrance of the external auditory meatus B, it is possible to produce excellent sound quality.

Figure 8:
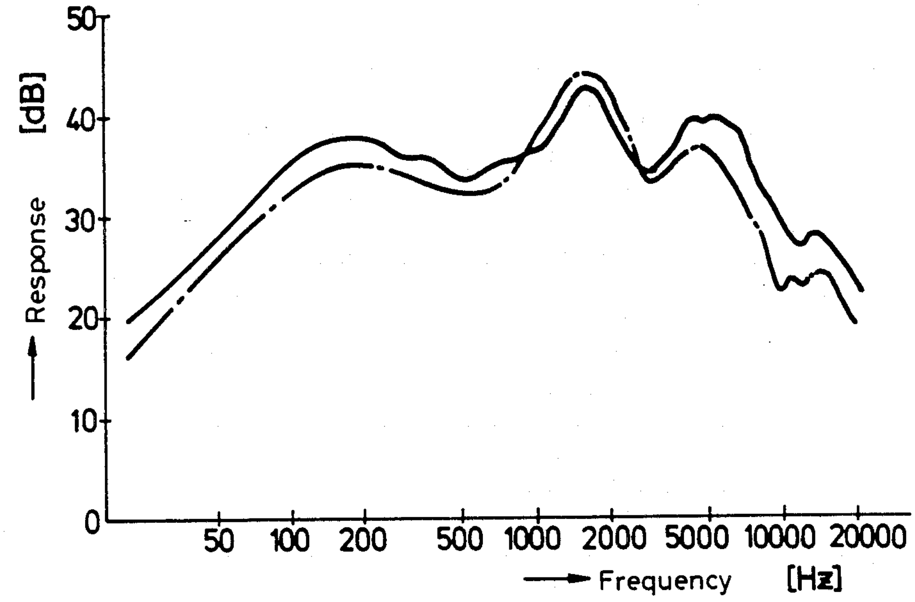
FIG. 8 is a graph useful for explaining the advantage of the headphone shown in FIG. 3.

In FIG. 8, the solid line indicates the frequency characteristic of the headphone according to the embodiment of the present invention, while the one-dot chain line indicates the frequency characteristic of the prior art headphone. As will be clear from the graph of FIG. 8, the headphone according to the embodiment of the present invention can produce a sound with a high quality which fluctuates lesser amounts in response over a wide frequency range, and which is greater in the high frequency range as compared with that of the prior art headphone.

Figure 10:
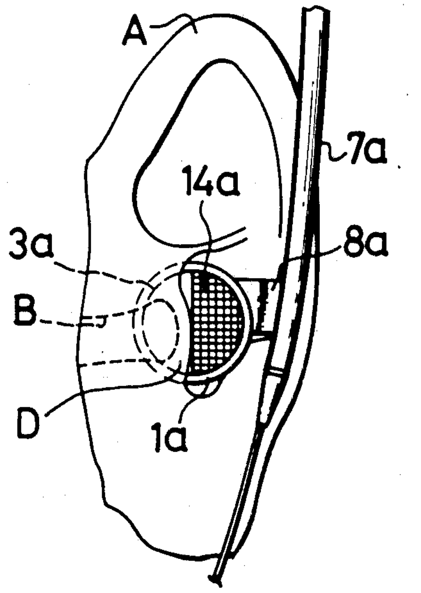
FIG. 10 is a partial front view of the headphone shown in FIG. 9 positioned in use and useful for explaining the headphone shown in FIG. 9 upon use.
Figure 9:
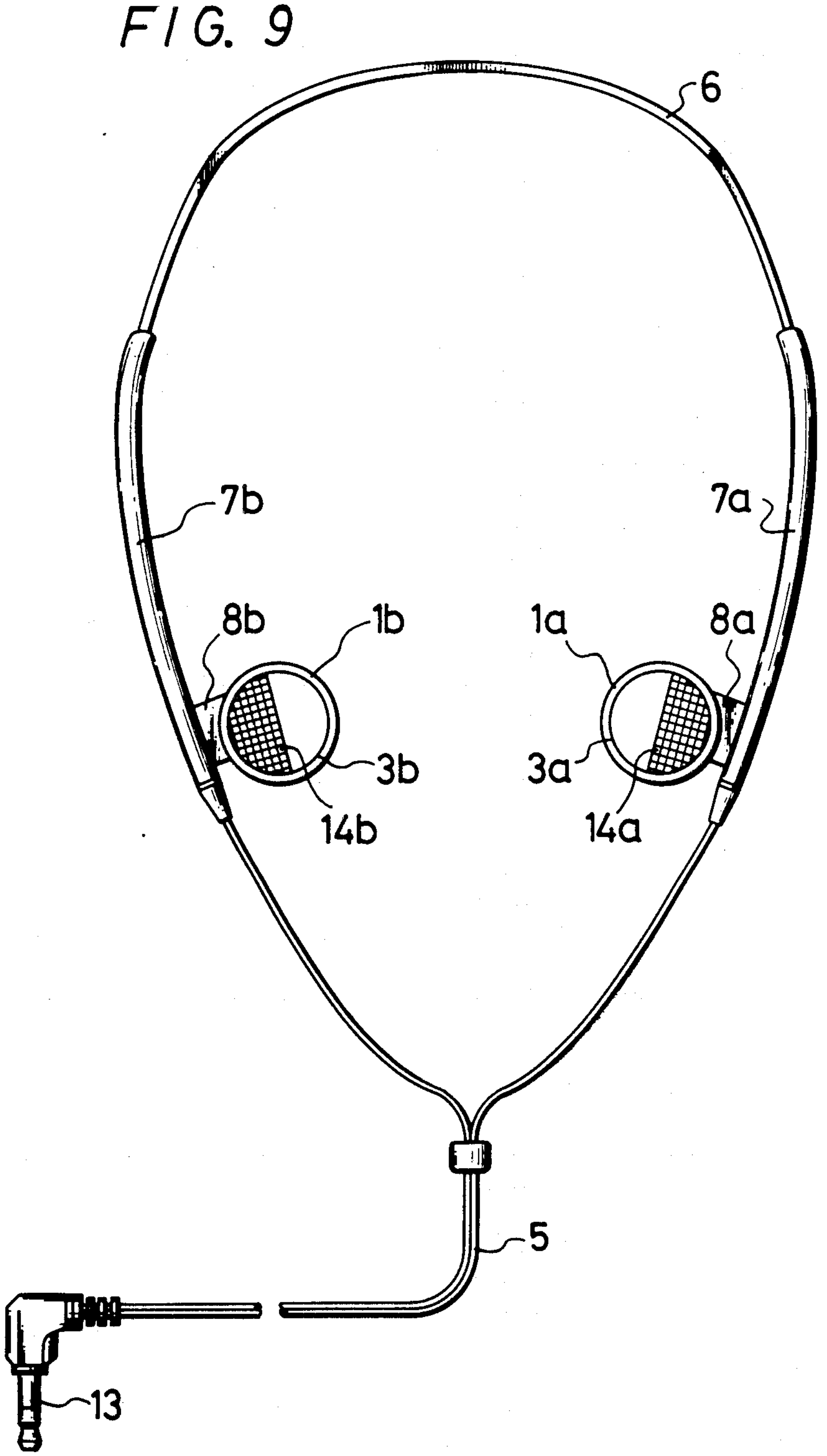
FIG. 9 is a front view showing another embodiment of the headphone according to the present invention.

FIGS. 9 and 10 show another embodiment of the headphone according to the present invention. In FIGS. 9 and 10, like parts corresponding to those of FIGS. 3 to 7 are marked with the same references and will not be described in detail.

According to this embodiment, as shown in FIG. 9, semi-circular shield plates 14*a* and 14*b* are attached to the insides of the protector members 3*a* and 3*b*. The shield plates 14*a* and 14*b* are used to lower the sound transmission coefficient of the sound emanated from the diaphragm 2*a* of the speaker unit 2. As shown in FIG. 10, the shield plate 14*a* on the side corresponding to the left ear is adapted to shield the left half of the diaphragm 2*a* of the speaker unit 2, while though not shown the shield plate 14*b* on the side corresponding to the right ear is adapted to shield the right half of the diaphragm 2*a* of the speaker unit 2. The other elements are formed same as those of the first embodiment shown in FIGS. 3 to 7.

With such arrangement as shown in FIGS. 9 and 10, if the headphone of this embodiment is used such that the diaphragm 2*a* of the speaker unit 2 is oppostie to the entrance of the external auditory meatus B as shown in FIG. 7, viewed at the front side of the user's face, substantially the inside half of each of the protector members 3*a* and 3*b* is covered with the tragus D and the like as shown in FIG. 9, while the remaining substantially half portion, namely, each of the portions shielded by the shield plates 14*a* and 14*b* is exposed. In this case, the sound emanated from the diaphragm 2*a* of the speaker unit 2 is radiated from its portion which is not shielded by each of the shield plates 14*a* and 14*b* so that the sound is leaked a little and hence the efficiency of sound transmission is made excellent. At that time, the high frequency component of the sound with strong directivity emanated from the portions of the diaphragm 2*a* opposing to the shield plates 14*a* and 14*b* is shielded by the shield plates 14*a* and 14*b* while the low frequency component of weak directivity diffracts the shield plates 14*a* and 14*b* and then is transmitted through the external auditory meatus B to the tympanum G. Thus, even in a speaker unit with a relatively small aperture whose low frequency component is apt to be insufficient, the low frequency component can be increased in auditory sense and excellent tone quality can be presented.

Figure 11:
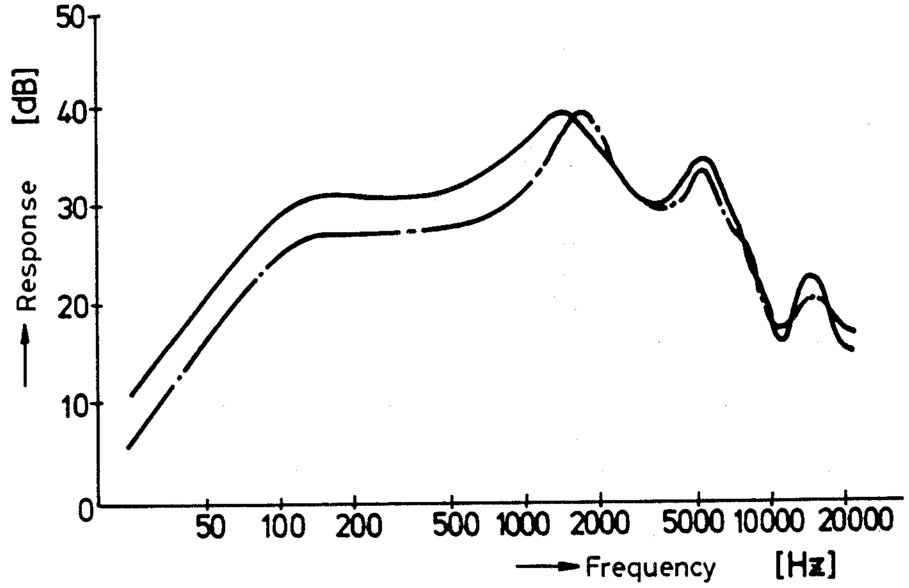
FIG. 11 is a graph useful for explaining the advantage of the headphone shown in FIG. 9.

In the graph of FIG. 11, the solid line indicates the frequency characteristic of the headphone according to the second embodiment of the present invention, while the one-dot chain line indicates the frequency characteristic of the headphone according to the first embodiment of the present invention shown in FIGS. 3 to 7. As will be clear from the graph of FIG. 11, according to the headphone of the present invention shown in FIGS. 9 and 10, the low frequency component which is apt to be lost in the speaker unit 2 with the small aperture can be increased and the excellent tone quality can be produced. It is needless to say that this second embodiment can achieve the same action and effect as those in the above first embodiment.

While in the above embodiments of the invention the supporting member formed of the headband 6, the hangers *7a*, *7b* and the like is used as the supporting member to support the speaker unit 2, if the headphone 2 is supported between the head H and the base of the auricle A, it is needless to say that the same action and effect as those in the above can be established. Also, it is needless to say that the present invention is not limited to the above embodiments but can take various modifications without departing from the essence of the present invention.

As set forth above, according to the headphone of the present invention, since the supporting member is provided for the speaker unit and the speaker unit can be held by the supporting member such that the diaphragm of the speaker unit is opposed to the entrance of the external auditory meatus, most of the sound emanated from the diaphragm of the speaker unit is directly transmitted to the tympanum. As a result, without being affected by the external auditory meatus and by the entrance of the external auditory meatus whose shapes are different dependent upon users, the headphone of the invention can produce sound with excellent tone quality and can satisfactorily be used without being influenced by the different sizes of the auricle.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A headphone comprising a first housing member including a speaker unit with a diaphragm emanating sound and having a front protector member passing the emanated sound forwardly therethrough and a supporting member for supporting said housing member, said housing member being sized to provide at least a portion thereof to extend transversely into the cavum concha of the listener's ear, said front member of said housing member being larger than the entrance of auditory meatus of the listener's ear in area and said supporting member supporting said housing member inside the cavum concha so that said front member faces fowardly toward the front of the listener's face thereby facing toward the entrance of the auditory meatus of the listener's ear inside said cavum concha.

2. A headphone according to claim 1, including a second housing member including a speaker unit with a diaphragm emanating sound and having a front member passing forwardly the sound therethrough and being connected to said first housing member through said supporting member for association with the listener's other ear.

3. A headphone according to claim 2, wherein each of said housing members is connected to said supporting member through a flexible joint.

4. A headphone according to claim 2, wherein each of said housing members is connected to said supporting member with the sound emanating direction of said diaphragm transverse to a plane defined by said supporting member.

5. A headphone according to claim 2, wherein each of said housing members is connected to said supporting member with the sound emanating direction of said diaphragm substantially perpendicular to a plane composed by said supporting member.

6. A headphone according to claim 1, wherein said housing member has a sound duct passing backward sound emanating from said diaphragm to the outside of the housing at the other side of the housing from said diaphragm.

7. A headphone according to claim 1, wherein said housing member has a partial imperforate shield plate between said front member and said diaphragm preventing sound emanating from said diaphragm from passing fowardly from a portion of said front member extending outwardly beyond the ear.

* * * * *